US005851639A

United States Patent [19]
Reinders

[11] Patent Number: 5,851,639
[45] Date of Patent: Dec. 22, 1998

[54] COVER FOIL WITH HEAT-ACTIVATED LAYER

[75] Inventor: Johannes Antonius Maria Reinders, Warnsveld, Netherlands

[73] Assignee: Sallmetall B.V., Raalte, Netherlands

[21] Appl. No.: 809,038

[22] PCT Filed: Sep. 22, 1995

[86] PCT No.: PCT/NL95/00318

§ 371 Date: Jun. 2, 1997

§ 102(e) Date: Jun. 2, 1997

[87] PCT Pub. No.: WO96/09928

PCT Pub. Date: Apr. 4, 1996

[30] Foreign Application Priority Data

Sep. 26, 1994 [NL] Netherlands ............................ 9401566
Nov. 11, 1994 [NL] Netherlands ............................ 9401885

[51] Int. Cl.$^6$ ...................................................... B32D 3/00
[52] U.S. Cl. ...................... 428/195; 428/204; 428/411.1; 428/488.4; 428/913; 428/914; 427/212
[58] Field of Search ............................. 428/488.4, 411.1, 428/913, 914, 195, 192, 204; 427/212

[56] References Cited

U.S. PATENT DOCUMENTS 4,063,641 12/1977 Kuehn .

FOREIGN PATENT DOCUMENTS 0207440  1/1987  European Pat. Off. .
0358445  3/1990  European Pat. Off. .
0374632  6/1990  European Pat. Off. .
0425820  5/1991  European Pat. Off. .
2450853  10/1980  France .

*Primary Examiner*—Elizabeth Evans
*Attorney, Agent, or Firm*—Webb Ziesenheim Bruening Logsdon Orkin & Hanson, P.C.

[57] ABSTRACT

The invention provides a light-transmitting cover foil intended to be arranged adheringly to a surface, for instance the surface of a carrier plate, optionally bearing information such as letters, numbers, images or the like, which foil consists of a laminate comprising: a first layer plastically deformable only at a relatively high first temperature, for instance in the range of 120° C.–200° C. and comprising for instance polycarbonate, PMMA, PVC, ABS, PP, PE, which first layer is provided before, during or after joining together to the other layers with a structure, for instance a texture and/or pattern pressed out of its main surface by exerting pressure and increasing temperature to at least the said first temperature, for instance by applying a heated profile roller; a second layer adhered thereto consisting of a dimensionally stable carrier layer comprising for instance polycarbonate, PMMA, PVC, polyester/PET, ABS; and a third layer adhered thereto which is meltable and thus thermally-activated at a relatively low second temperature, for instance in the range of 50° C.–90° C. and which consists of a hot-melt layer or glue layer, comprising for instance EVA, EEA, EBA, EMA, GBA or other low-melting plastics including polyolefins and copolymer esters, polyacetate esters, softened PVCs; which said layers are mutually connected by adhesive agents, for instance by making use of coextrusion.

13 Claims, No Drawings

COVER FOIL WITH HEAT-ACTIVATED LAYER

FIELD OF THE INVENTION

The invention relates to a light-transmitting, for instance transparent, cover foil intended for adhesion to an optionally information-carrying surface.

BACKGROUND OF THE INVENTION

A light-transmitting foil for adhesion to an optionally information-carrying surface is known. This known foil comprises a first layer of polyester and a pressure-sensitive or heat-activated glue layer connected thereto.

It is an object of the invention to embody a cover foil such that it can offer a combination of two aspects, that is, a first layer provided with a structure and a heat-activated glue layer. The existing structure may not be adversely affected when the glue layer is activated.

The described, known foil does not meet these requirements.

It is therefore an object of the invention to provide a light-transmitting cover foil which has a structure, for instance a texture and/or a pattern pressed out of its main surface, while provisions are also present to adhere the foil to a surface for covering using simple means and without adversely affecting the existing structure.

SUMMARY OF THE INVENTION

In respect of the above the invention provides a light-transmitting cover foil intended to be arranged adheringly to a surface, for instance the surface of a carrier plate, optionally bearing information such as letters, numbers, images or the like, which foil consists of a laminate comprising of:

a first layer plastically deformable only at a relatively high first temperature, for instance in the range of 120° C.–200° C. and comprising for instance polycarbonate, PMMA, PVC, ABS, PP, PE, which first layer is provided before, during or after joining together to the other layers with a structure, for instance a texture and/or a pattern pressed out of its main surface by exerting pressure and increasing temperature to at least the first temperature, for instance by applying a heated profile roller;

a second layer adhered thereto consisting of a dimensionally stable carrier layer comprising for instance polycarbonate, PMMA, PVC, polyester/PET, ABS; and a third layer adhered thereto which is meltable and thus heat-activated at a relatively low second temperature, for instance in the range of 50° C.–90° C. and which consists of a hot-melt layer or glue layer, comprising for instance EVA, EEA, EBA, EMA, GBA or other low-melting plastics including polyolefins and copolymer esters, polyacetate esters, softened PVCs;

which layers are mutually connected by adhesive agents, for instance by making use of co-extrusion.

DETAILED DESCRIPTION OF THE INVENTION

The present invention includes a foil having a laminate including:

a first layer plastically deformable only at a relatively high first temperature, for instance in the range of 120° C.–200° C. and comprising for instance polycarbonate, PMMA, PVC, ABS, PP, PE, which first layer is provided before, during or after joining together to the other layers with a structure, for instance a texture and/or a pattern pressed out of its main surface by exerting pressure and increasing temperature to at least the first temperature, for instance by applying a heated profile roller;

a second layer adhered thereto consisting of a dimensionally stable carrier layer comprising for instance polycarbonate, PMMA, PVC, polyester/PET, ABS; and a third layer adhered thereto which is meltable and thus heat-activated at a relatively low second temperature, for instance in the range of 50° C.–90° C. and which consists of a hot-melt layer or glue layer, comprising for instance EVA, EEA, EBA, EMA, GBA or other low-melting plastics including polyolefins and copolymer esters, polyacetate esters, softened PVCs;

which layers are mutually connected by adhesive agents, for instance by making use of co-extrusion.

Attention is drawn to the fact that polyester/PET is excluded as material for the first layer.

The invention is based on the insight that the structuring of the first layer can take place in advance and that due to the relatively high softening temperature of the applied material, on the order of for instance 180° C., when the glue layer is activated, for instance at a temperature of 70° C., the first layer including its structure is not affected, while the glue layer is nevertheless fully activated so that the cover foil can be adhered effectively to the surface for covering.

The second layer includes, for example, a polyester which is to a large degree non-stretching and non-shrinking. This layer also makes it possible to heat a strip of cover foil in a laminating machine without resulting in a softening of the total cover foil which otherwise would limit the ease of handling thereof.

A specific embodiment has the special feature that the first layer and the second layer consist of one integral, chemically substantially homogeneous layer. Attention is once again drawn to the fact that polyester is excluded as material for the first layer. In this case both integrated layers must therefore consist of a material from which polyester/PET is excluded.

A specific embodiment has the special feature that the adhesive agents comprise an adhesion-enhancing activation of at least the adhesive surface, for instance a corona treatment, particularly in the case of polyester and polypropylene. Other related treatments such as an ion bombardment may also be appropriate.

The adhesion between the diverse layers can in principle take place in any suitable manner. A specific embodiment is that in which the adhesive agents comprise an adhesive layer such as a layer of primer adhering to both the surfaces for adhesion.

All suitable means can be considered to provide the first layer with a structure. A specific embodiment is that in which the first layer is provided in advance with a structure by a mechanical, chemical and/or physical treatment or with a covering layer forming a structure, for instance by vapour-deposition, sputtering or the like.

In general the softening temperature of the first and third layer will have to differ substantially, for instance in the order of at least 30° C. It is in any case necessary to avoid the structure of the fist layer being adversely affected when the cover foil is heated to stick it onto a surface for covering.

In order to ensure a good UV-stability the laminate can comprise a UV-blocking layer, for instance a lacquer layer, present at a suitable position.

I claim:

1. A light-transmitting cover foil intended to be adhered to a surface, which foil consists of a laminate comprising:

a first layer plastically deformable only at a first temperature which first layer is provided with a structure formed before, during or after joining together to other layers;

a second layer adhered to said first layer and consisting of a dimensionally stable carrier layer; and a third layer adhered to said second layer which is meltable and heat-activatable at a second temperature lower than the first temperature, wherein said layers are connected to each other.

2. A cover foil as claimed in claim 1, wherein the first layer and the second layer are chemically substantially similar.

3. A cover foil as claimed in claim 1, wherein each said layer includes an adhesive surface of each said layer and an adhesive layer comprising a layer of primer adhering to said adhesive surfaces.

4. A cover foil as claimed in claim 1, wherein the first layer is provided with a structure formed by a mechanical, chemical and/or physical treatment or with a covering layer forming a structure formed by vapour-deposition or sputtering, the structure being formed before the first layer is joined to the other layers.

5. A cover foil as claimed in claim 1, wherein a difference between the first temperature and the second temperature is at least about 30° C.

6. A cover foil as claimed in claim 1, wherein the first temperature is about 120° C.–200° C. and the second temperature is about 50° C.–90° C.

7. A cover foil as claimed in claim 1, wherein said first layer comprises a substance selected from the group consisting of polycarbonate, PMMA, PVC, ABS, PP and PE.

8. A cover foil as claimed in claim 1, wherein said second layer comprises a substance selected from the group consisting of polycarbonate, PMMA, PVC, polyester/PET and ABS.

9. A cover foil as claimed in claim 1, wherein said third layer comprises a substance selected from the group consisting of EVA, EEA, EBA, EMA, GBA and low-melting plastics selected from the group consisting of a polyolefin, a copolymer ester, a polyacetate ester and a softened PVC.

10. A cover foil as claimed in claim 1, wherein said first layer structure is produced by exerting pressure on said first layer with a member having a surface profile and increasing the temperature of said first layer to at least the first temperature whereby a texture or pattern is formed in said first layer.

11. A cover foil as claimed in claim 10, wherein said member is a heated profile roller.

12. A cover foil as claimed in claim 1, wherein said first layer, second layer and third layer are coextruded.

13. A cover foil as claimed in claim 1, wherein each said layer includes an adhesive surface, said adhesive surfaces facing each other and being adhesion-enhancing activated.

* * * * *